United States Patent
Grundmann et al.

(10) Patent No.: US 10,454,341 B1
(45) Date of Patent: Oct. 22, 2019

(54) PROGRESSIVE FORCE ELECTRO-PERMANENT MAGNETS ACTUATOR

(71) Applicant: X Development LLC, Mountain View, CA (US)

(72) Inventors: Michael Grundmann, San Jose, CA (US); Jonathan Ross, Mountain View, CA (US)

(73) Assignee: X Development LLC, Mountain View, CA (US)

(*) Notice: Subject to any disclaimer, the term of this patent is extended or adjusted under 35 U.S.C. 154(b) by 406 days.

(21) Appl. No.: 15/393,295

(22) Filed: Dec. 29, 2016

Related U.S. Application Data

(60) Provisional application No. 62/428,013, filed on Nov. 30, 2016.

(51) Int. Cl.
*H01F 7/20* (2006.01)
*H02K 7/106* (2006.01)
(Continued)

(52) U.S. Cl.
CPC ............ *H02K 7/106* (2013.01); *F16D 63/002* (2013.01); *H01F 7/20* (2013.01); *H02K 1/17* (2013.01);
(Continued)

(58) Field of Classification Search
CPC ............ H02K 1/17; H02K 3/28; H02K 7/106; H02K 7/1021; H02K 1/2793; F16D 63/002; H01F 7/20
See application file for complete search history.

(56) References Cited

U.S. PATENT DOCUMENTS 4,121,139 A * 10/1978 Putt .................. F04B 17/042
310/34
4,516,102 A * 5/1985 Rask .................. H01F 7/08
335/229
(Continued)

FOREIGN PATENT DOCUMENTS

WO WO 2009/069146 A1 6/2009
WO WO 2010/128527 A2 11/2010
(Continued)

OTHER PUBLICATIONS

Knaian, Ara Nerses, "Electropermanent Magnetic Connectors and Actuatore: Devices and Their Application in Programmable Matter," Massachusetts Institute of Technology, dated Jun. 2010, Part I pp. 1-103.

(Continued)

*Primary Examiner* — Ramon M Barrera
(74) *Attorney, Agent, or Firm* — Fish & Richardson P.C.

(57) ABSTRACT

An example system includes a disk that is rotatable and has a plurality of ferromagnetic elements disposed in a radial array on a surface of the disk; and at least one electro-permanent magnet (EPM) mounted adjacent to the disk such that a gap separates the disk from the EPM. Applying an electric pulse to the at least one EPM changes a magnetic state thereof, thereby generating an external magnetic field that traverses the gap between the disk and the EPM and interacts with a ferromagnetic element of the plurality of ferromagnetic elements, and causing a rotational speed of the disk to change as the disk rotates.

7 Claims, 9 Drawing Sheets

(51) Int. Cl.
  *H02K 1/17* (2006.01)
  *H02K 3/28* (2006.01)
  *H02K 1/27* (2006.01)
  *H02K 7/102* (2006.01)
  *F16D 63/00* (2006.01)
(52) U.S. Cl.
  CPC ............ *H02K 1/2793* (2013.01); *H02K 3/28* (2013.01); *H02K 7/1021* (2013.01)

(56) References Cited

U.S. PATENT DOCUMENTS

| | | | |
|---|---|---|---|
| 5,394,132 A * | 2/1995 | Poil | A61F 2/54 335/222 |
| 7,764,020 B2 | 7/2010 | Barnett | |
| 2010/0308519 A1 | 12/2010 | Sarda | |
| 2014/0202374 A1 | 7/2014 | Filosa et al. | |
| 2014/0285930 A1 | 9/2014 | Powell | |

FOREIGN PATENT DOCUMENTS

| WO | WO 2012/029073 A1 | 3/2012 |
|---|---|---|
| WO | WO 2014/033757 A1 | 3/2014 |
| WO | WO 2016087998 A2 | 6/2016 |

OTHER PUBLICATIONS

Knaian, Ara Nerses, "Electropermanent Magnetic Connectors and Actuatore: Devices and Their Application in Programmable Matter," Massachusetts Institute of Technology, dated Jun. 2010, Part II pp. 104-206.

* cited by examiner

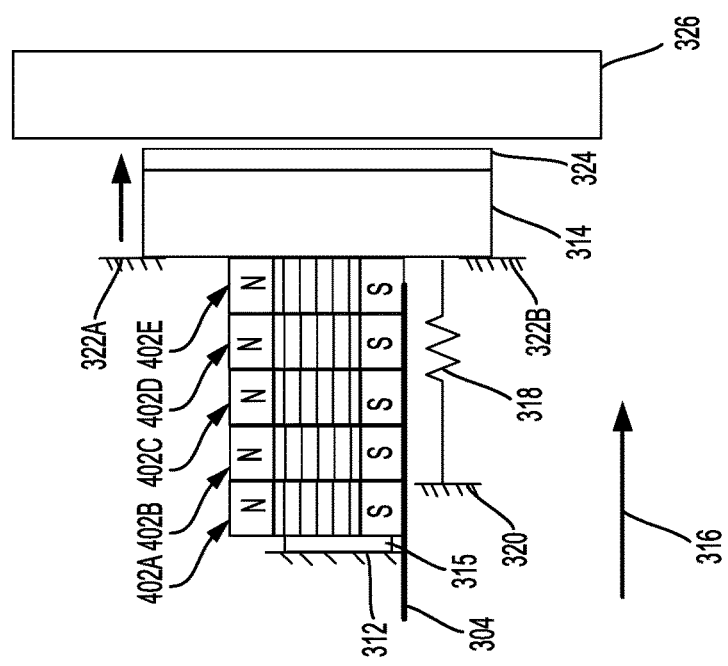

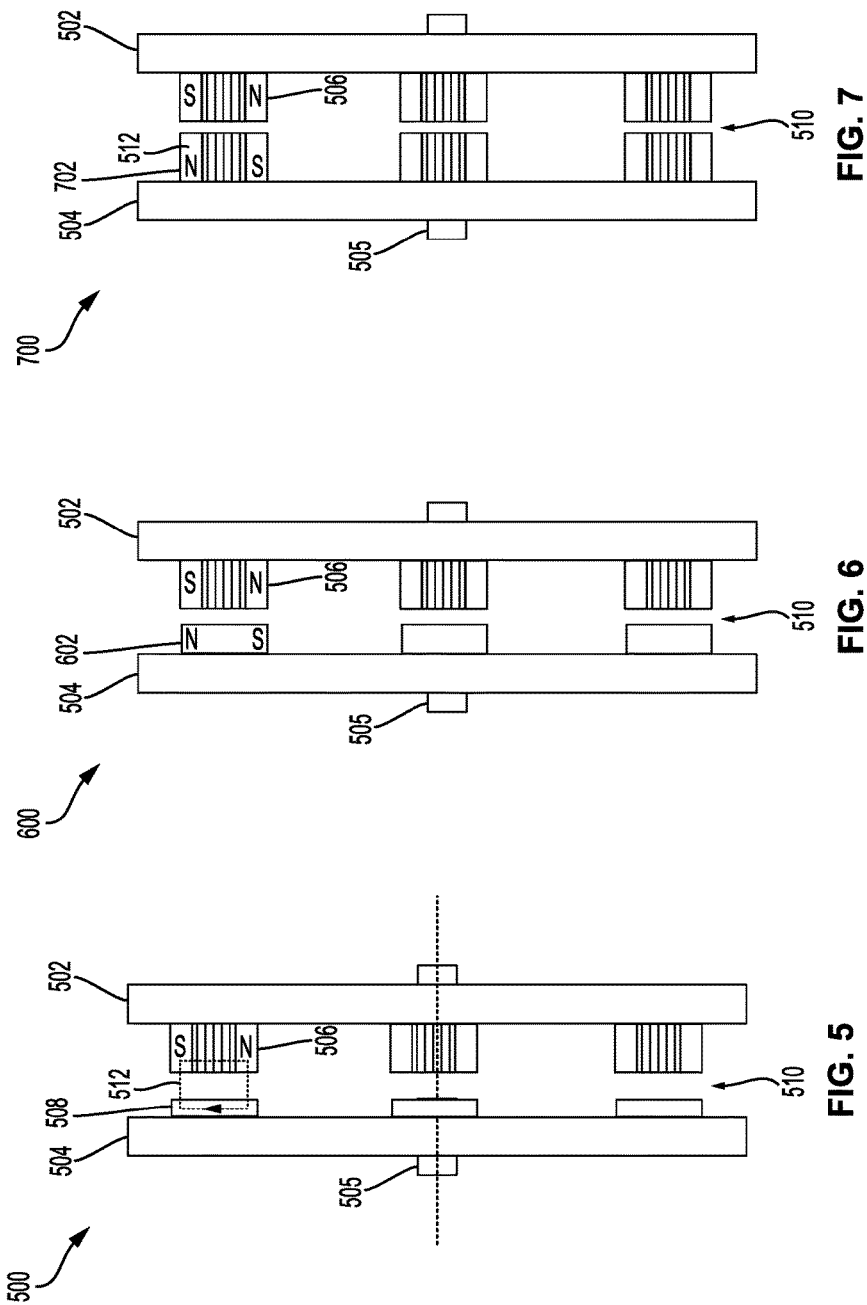

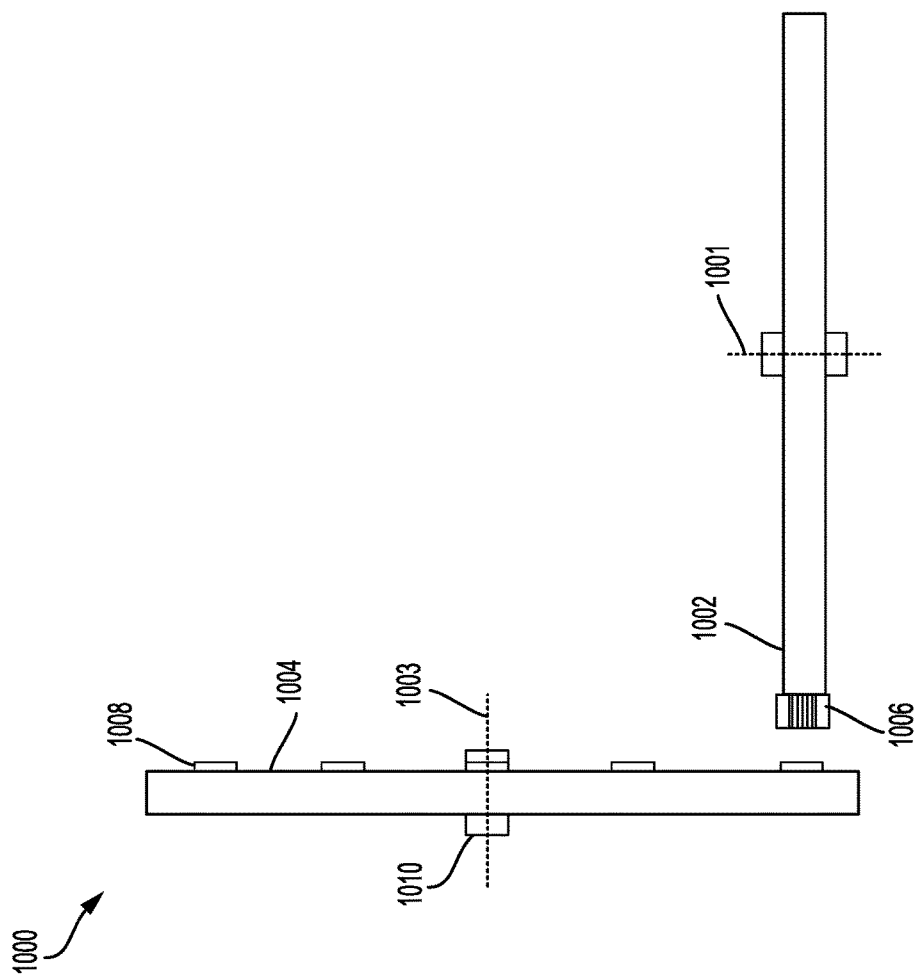

PROGRESSIVE FORCE ELECTRO-PERMANENT MAGNETS ACTUATOR

CROSS REFERENCE TO RELATED APPLICATION

The present application claims priority to U.S. Provisional patent application Ser. No. 62/428,013, filed on Nov. 30, 2016, and entitled "Progressive Force Electro-Permanent Magnets Actuator," which is herein incorporated by reference as if fully set forth in this description.

BACKGROUND

The term "brake" may refer generally to a mechanical device or system that may constrain a moving system by absorbing energy therefrom. It is used for slowing or stopping a moving object, wheel, axle, or to prevent its motion. In many brake systems, the operation of absorbing energy is accomplished via means of friction, which might cause component wear and generate heat.

SUMMARY

The present disclosure describes embodiments that relate to a progressive force electro-permanent magnets actuator.

In one aspect, the present disclosure describes a braking system. The braking system includes a first disk that is fixed and has one or more EPMs disposed in a radial array on a surface of the first disk; and a second disk rotatably mounted adjacent to the first disk such that a gap separates the second disk from the first disk. The second disk has a plurality of ferromagnetic elements disposed in respective radial array on a respective surface of the second disk. Applying an electric pulse to at least one EPM of the one or more EPMs changes a magnetic state of the EPM, thereby (i) generating an external magnetic field that traverses the gap between the first disk and the second disk and interacts with a ferromagnetic element of the plurality of ferromagnetic elements, and (ii) causing a rotational speed of the second disk to change as the second disk rotates.

In another aspect, the present disclosure describes a braking system that includes a disk that is rotatable and has a plurality of ferromagnetic elements disposed in a radial array on a surface of the disk; and at least one electro-permanent magnet (EPM) mounted adjacent to the disk such that a gap separates the disk from the EPM. Applying an electric pulse to the at least one EPM changes a magnetic state thereof, thereby (i) generating an external magnetic field that traverses the gap between the disk and the EPM and interacts with a ferromagnetic element of the plurality of ferromagnetic elements, and (ii) causing a rotational speed of the second disk to change as the disk rotates.

In still another aspect, the present disclosure describes an actuator. The actuator includes a piston; a stop element; and a series of electro-permanent magnets (EPMs). The series of EPMs includes at least a first EPM and a second EPM. The series of EPMs is constrained between the piston and the stop element. Each EPM may be switched between (i) an activated state in which the EPM exhibits an external polarized magnetic field and (ii) a passive state in which the EPM does not exhibit an external polarized magnetic field. The first EPM and second EPM are arranged such that when both the first EPM and the second EPM are in the activated state, a magnetic pole of the first EPM is adjacent to the a like magnetic pole of the second EPM, and the first EPM and the second EPM exhibit a repulsive force between them causing a motive force on the piston away from the stop element. When both the first EPM and the second EPM are in the passive state, they do not exhibit a repulsive force between them and do not cause a motive force on the piston away from the stop element.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4 illustrates an actuator with electro-permanent magnets having a different orientation compared to the electro-permanent magnets shown in FIG. 3, in accordance with an example implementation.

FIG. 5 illustrates a side view of a braking system, in accordance with an example implementation.

FIG. 6 illustrates a braking system with ferromagnetic elements configured as permanent magnets, in accordance with an example implementation.

FIG. 7 illustrates a braking system with ferromagnetic elements configured as electro-permanent magnets, in accordance with an example implementation.

FIG. 10 illustrates a braking system with an axis of a first disk being perpendicular to an axis of rotation of a second disk, in accordance with an example implementation.

DETAILED DESCRIPTION

Figure 1B:
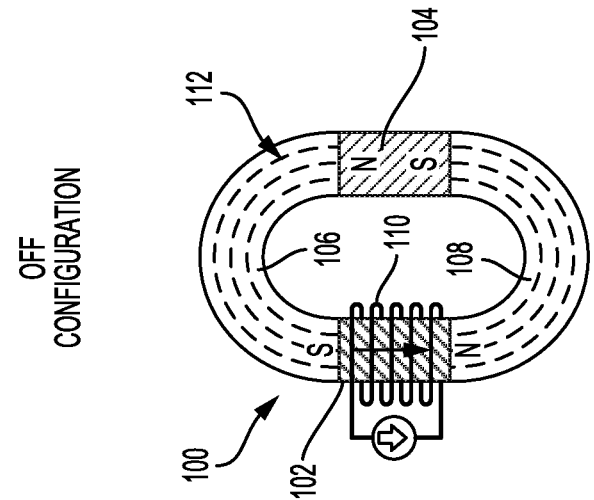
FIG. 1B illustrates the electro-permanent magnet of FIG. 1A in an "OFF" configuration, in accordance with an example implementation.

The following detailed description describes various features and functions of the disclosed systems with reference to the accompanying figures. The illustrative system and apparatus embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. Overview

An actuator is a component of a machine that is configured for moving or controlling a mechanism or system. The actuator may be coupled to an energy source (e.g., electric power, pressurized hydraulic fluid or gas from a pump). For the actuator to operate, it receives a control signal from a controller, and then the actuator responds by converting the energy from the source of energy into mechanical motion. As the actuator moves, it may apply a particular force having a magnitude is based on the level of energy supplied by the energy source. The control signal could be relatively low energy and may be electric voltage or current, pneumatic or hydraulic pressure, or even human power.

In some examples, it may be desirable to apply a force of varying magnitudes based a given input. For instance, the actuator could be coupled to a brake pad, and it may be desired to apply different braking forces based on a speed of an object being slowed down or some other input. However, in these examples, larger amount of energy are supplied from the energy source to applying larger forces. Hence, an actuator that can apply forces of varying or progressive magnitude, while improve efficiency and reducing energy consumption can be beneficial.

Disclosed herein are apparatuses and systems that involve using electro-permanent magnets in an actuator to apply progressive forces while reducing energy consumption.

II. Example Electro-Permanent Magnets

An electro-permanent magnet (EPM) is a type of magnet that includes both an electromagnet and a dual material permanent magnet. A magnetic field produced by the electromagnet is used to change the magnetization of the permanent magnet. In an example, the permanent magnet includes magnetically soft and hard materials, where the soft material has lower magnetic coercivity compared to the hard material and can thus have its magnetization changed. When the magnetically soft and hard materials have opposite magnetizations, the EPM has no net field, and when they are aligned, the EPM generates an external polarized magnetic field.

Figure 1A:
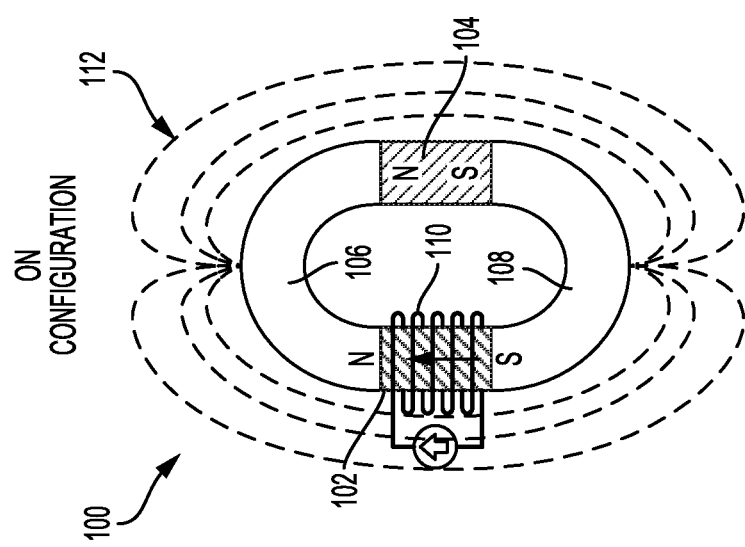
FIG. 1A illustrates an electro-permanent magnet in an "ON" configuration, in accordance with an example implementation.

FIG. 1A illustrates an EPM 100 in an "ON" configuration, and FIG. 1B illustrates the EPM in an "OFF" configuration, in accordance with an example implementation. The EPM 100 includes two permanent magnets 102 and 104 connected by u-shaped elements 106 and 108.

The elements 106 and 108 could be made, for example, of a high magnetic permeability material or iron alloy such as magnet steel. As an example, the elements 106 and 108 could be made of Hiperco®, which includes an iron-cobalt-vanadium soft magnetic alloy that exhibits high magnetic saturation (24 kilogauss), high direct current maximum permeability, low direct current coercive force, and low alternating current core loss. However, other materials could be used.

The permanent magnet 102 is a low coercivity magnet. As an example, the permanent magnet 102 could include an iron alloy, which in addition to iron, may include aluminum (Al), nickel (Ni) and cobalt (Co), and thus this iron alloy may be referred to by the acronym AlNiCo. The permanent magnet 104 is a high coercivity magnet. As an example, the permanent magnet 104 could include N40 grade rare-earth magnets such as a neodymium magnet, also known as NdFeB, NIB or Neo magnet, which is a rare earth permanent magnet made from an alloy of neodymium, iron and boron. Both example materials, i.e., NdFeB and AlNiCo, may have the same remanence (around 1.3 Teslas) but AlNiCo has a lower intrinsic coercivity of 50 kiloamperes/meter (kA/m) while NdFeB has an intrinsic coercivity of 1120 kA/m. In the description provided herein AlNiCo and NdFeB are used as examples of materials for the permanent magnets 102 and 104; however, other materials could be used where one magnetic material has a lower coercivity than the other.

A coil 110 is wound around the permanent magnet 102. The coil 110 is designed such that if an electric pulse (e.g., electric current or voltage pulse) of sufficient power and duration is provided through the coil 110 in one direction, the generated magnetic field will be higher than the intrinsic coercivity ($H_{ci}$) of the permanent magnet 102, and can thus change is magnetic state or magnetization. In this case, the permanent magnet 102 will be magnetized in the direction of the field inside the coil 110. Applying an electric pulse in the opposite direction will lead to magnetize the permanent magnet 102 in the opposite direction.

For example, if the permanent magnet 102 is magnetized such that the north pole (N) of both permanent magnets 102 and 104 are pointing in the same direction (e.g., up in FIG. 1A), the magnetic configuration of FIG. 1A is obtained. Particularly, the element 106 would have two magnetic norths at its ends and the element 108 would have two magnetic souths (S) at its ends. In this case, the element 106 may operate as a north pole of the EPM 100, and the element 108 may operate as a south pole of the EPM 100. Further, the element 106 may concentrate generated magnetic flux lines 112, but might not contain the magnetic flux, and thus the magnetic flux will flow externally through the air (or other external medium) seeking the element 108 (magnetic south). In this configuration, the EPM 100 may be referred to as being in an "ON" or activated state.

Applying an electric pulse through the coil 110 in the opposite direction magnetizes the permanent magnet 102 in the opposite direction. Thus, in this case, the element 106 would have a north pole (N) at one end and a south pole (S) at the other end, whereas the element 108 has opposite poles at its ends compared to the element 106 as illustrated in FIG. 1B. In this configuration, the magnetic flux lines 112 may be concentrated inside both elements 106 and 108 creating a closed circuit for the magnetic field because of the high permeability of the iron. However, no external magnetic field is generated and the EPM 100 may be referred to as being in an "OFF" or passive state. In this manner, using an electric pulse through the coil 110, the magnetic state of the EPM 100 can be switched between the "ON" and "OFF" states.

The terms "ON state" and "activated state" are used herein interchangeably. Also, the terms "OFF state" and "passive state" are used herein interchangeably.

Although FIGS. 1A-1B illustrate the coil 110 wound around the permanent magnet 102, but not the permanent magnet 104, in other example configurations, the coil 110 could be wound around both permanent magnets 102 and 104. As long as one of the magnets has lower intrinsic coercivity than the other, and the power of the electric pulse is less than a particular threshold, the magnetization direction of the magnet with lower coercivity would flip without changing the other's direction of magnetization assuming the power and duration.

Figure 2A:
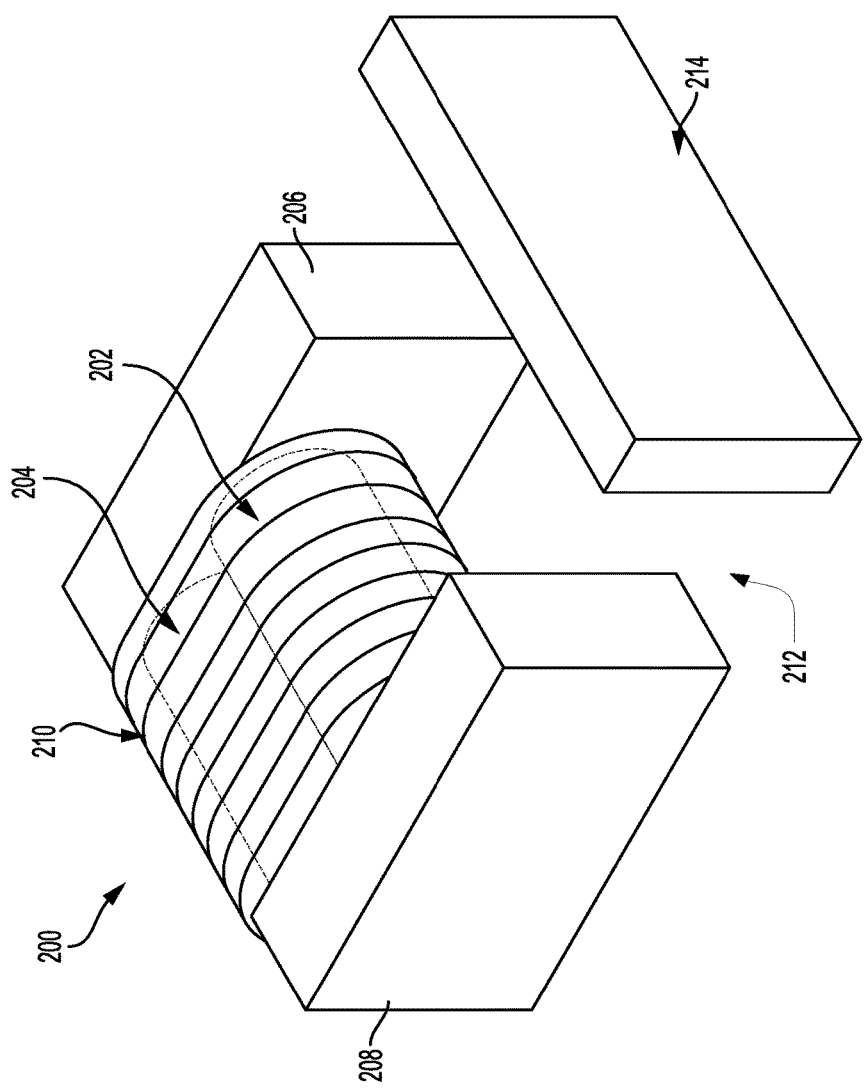
FIG. 2A illustrates an alternative configuration for an electro-permanent magnet, in accordance with an example implementation.

FIG. 2A illustrates an alternative configuration for an EPM 200, in accordance with an example implementation. As shown in FIG. 2A, the EPM 200 includes a first permanent magnet 202 made of, for example, AlNiCO and a permanent magnet 204 made of, for example, NdFeB. The permanent magnets 202 and 204 are disposed between keepers or elements 206 and 208 (made from magnet steel or Hiperco®, for example) configured to hold the permanent magnets 202 and 204 and concentrate magnetic flux lines. The permanent magnets 202 and 204 could be substantially parallel to each other. The permanent magnet 202 is shown disposed below the permanent magnet 204; however, other configurations are possible.

A coil 210 is wound around both permanent magnets 202 and 204. The coil 210 is designed such that if an electric pulse of sufficient power and duration is provided therethrough, the generated magnetic field will be higher than the intrinsic coercivity ($H_{ci}$) of the first permanent magnet 202, but not the second permanent magnet 204. Thus, magnetization of the first permanent magnet 202 may change, while magnetization of the second permanent magnet 204 remains unchanged.

When the EPM 200 is in the "ON" state with both permanent magnets 202 and 204 magnetized in the same direction, the generated external magnetic field traverses a gap 212 and interacts with a target object 214. Particularly, if the target object is made of a ferromagnetic material (e.g., magnet steel), then the generated external magnetic field may cause the target object 214 to be attracted to the EPM 200 and specifically to the elements 206 and 208.

In some examples, the target object 214 could include a permanent magnet or another EPM. Also, in FIG. 2A, the elements 206 and 208 protrude beyond the permanent magnets 202 and 204 so as to attract the target object 214 thereto without the target object 214 interfering with the permanent magnets 202 and 204. In other examples, however, the elements 206 and 208 could be made shorter as shown below with respect to FIGS. 3-7.

Figure 2B:
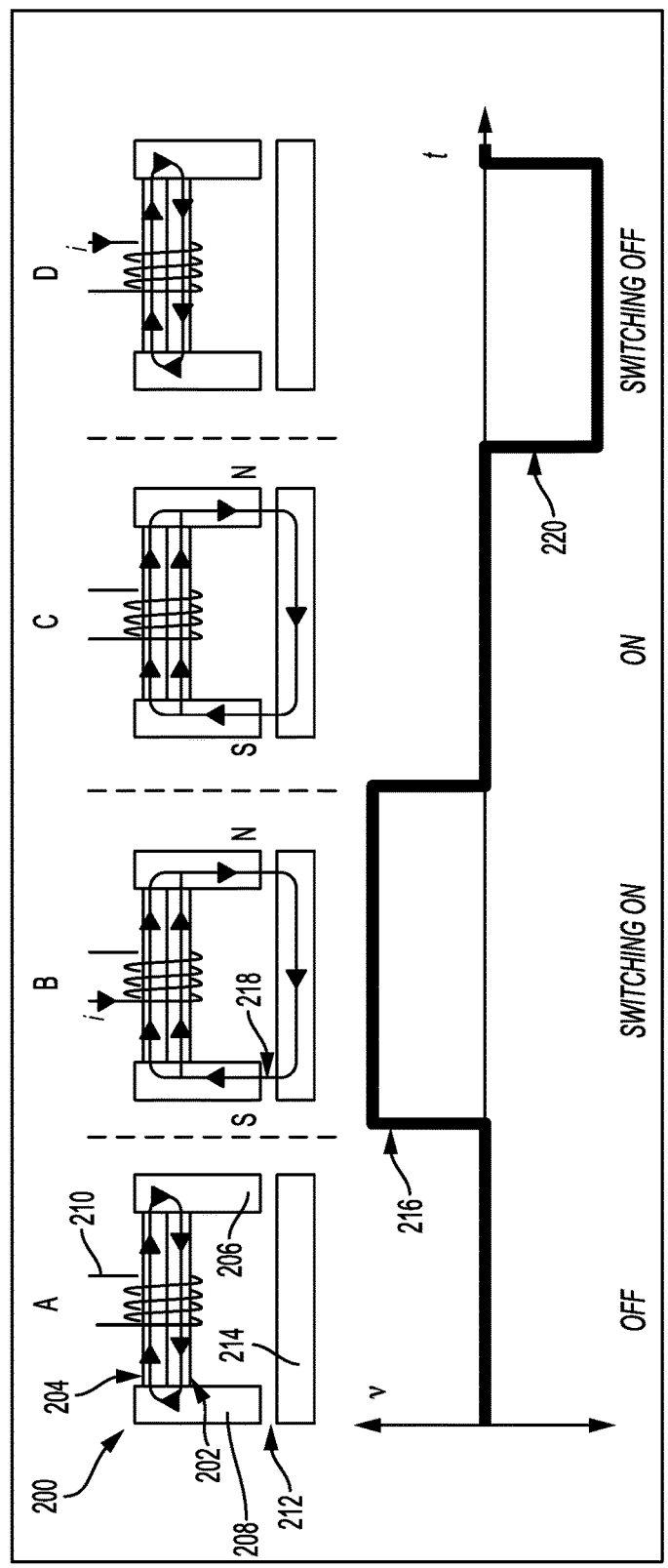
FIG. 2B illustrates operation of the electro-permanent magnet shown in FIG. 2A, in accordance with an example implementation.

FIG. 2B illustrates operation of the EPM 200 in conjunction with the target object 214, in accordance with an example implementation. FIG. 2B illustrates the EPM 200 in four states: A, B, C, and D. State A illustrates the EPM 200 in the "OFF" state, state B illustrates switching on the EPM 200, state C illustrates the EPM 200 in the "ON" state, and state D illustrates switching off the EPM 200. Reference numerals for the permanent magnets 202 and 204, the elements 206 and 208, the coil 210, the gap 212, and the target object 214 are shown in state A, but not the other states of FIG. 2B to reduce visual clutter in the drawing.

In the "OFF" state shown in state A, the two permanent magnets 202 and 204 are oppositely polarized, and thus the resulting magnetic flux circulates inside the EPM 200, and no magnetic force acts on the target object 214. When a positive electric pulse 216 is provided through the coil 210 as shown in state B, a clockwise magnetic flux is imposed through the first permanent magnet 202 thus magnetizing it rightward such that both permanent magnets 202 and 204 are magnetically polarized in the same direction. As a result, the magnetic field of the first permanent magnet 202 reinforces the magnetic field of the second permanent magnet 204 and an external polarized magnetic field represented by flux line 218 is generated. The element 206 operates as a north pole (N) and the element 208 operates as a south pole (S). The external magnetic field traverses the gap 212 and attracts the target object 214 toward the EPM 200.

The EPM 200 remains in the "ON" state even when the electric pulse 216 ends as shown in state C. Therefore, the EPM 200 is distinguished from electromagnets in that the EPM 200 may remain in the "ON" state without a continuous current through the coil 210. Thus the EPM 200 operates with a reduced power consumption compared to electromagnets.

When a negative electric pulse 220 is provided through the coil 210 as shown in state D, a counter-clockwise magnetic field represented by flux line 222 is imposed through the first permanent magnet 202 thus magnetizing it leftward such that the two permanent magnets 202 and 204 are oppositely polarized. The external magnetic field represented by the flux line 218 in state B then decays and disappears, and no magnetic force acts on the target object 214. Thereafter, the EPM 200 reverts back to the "OFF" state illustrated in state A.

III. Example Progressive Force EPM Actuators

EPMs could be used to enable an actuator to apply a varying force while using a reduced amount of power compared to other actuators. The actuator could, for example, be used in a braking system. The braking system may involve a brake pad contacting a moving object to slow it down. However, in other configurations, EPMs may enable slowing down a moving object while reducing or eliminating friction as described below with respect to FIGS. 5-10.

Figure 3:
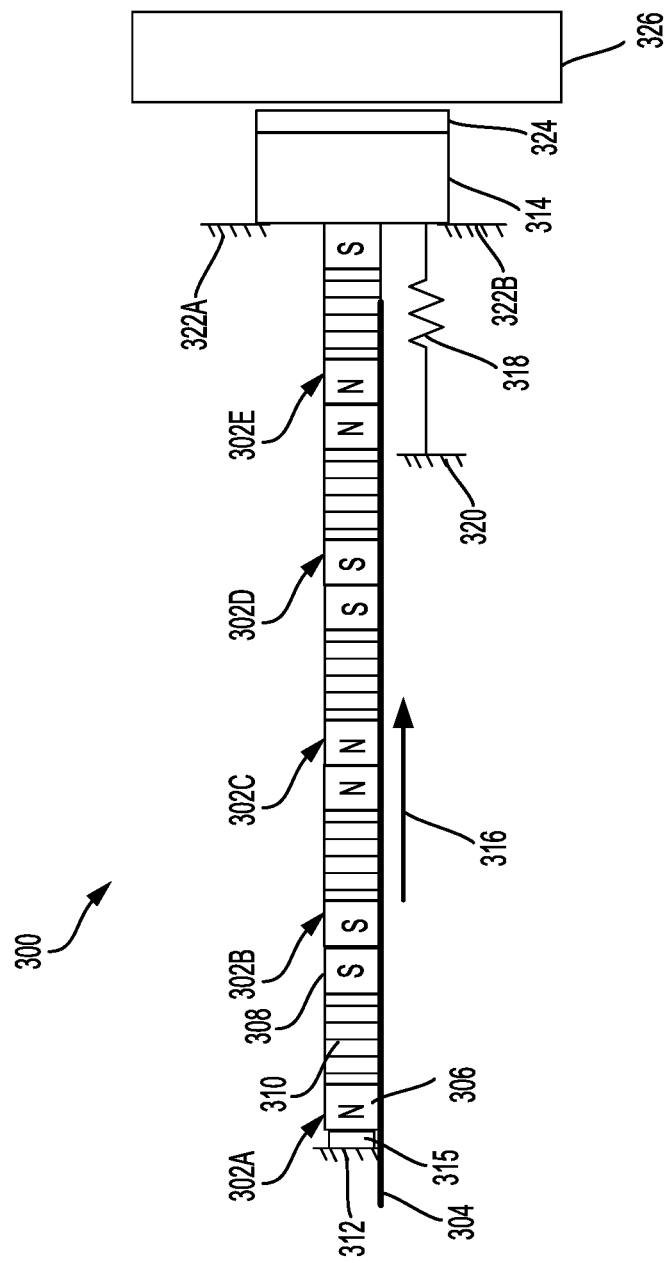
FIG. 3 illustrates an actuator having electro-permanent magnets, in accordance with an example implementation.

FIG. 3 illustrates an actuator 300 having EPMs, in accordance with an example implementation. The actuator 300 includes a series of EPMs such as EPMs 302A, 302B, 302C, 302D, and 302E. Five EPMs are used here as an example for illustration only, and more or fewer EPMs could be used. The EPMs 302A-E are disposed in series on a surface 304. In other examples, the EPMs could be disposed within a tube or other structure.

The EPMs 302A-E could, for example, be similar to the EPM 200 described above. For instance, the EPM 302A includes a first element 306, a second element 308, and a coil 310 that surrounds two permanent magnets similar to the permanent magnets 202 and 204. The permanent magnets are not shown to reduce visual clutter in the drawings. For example, the elements 306 and 308 correspond to the elements 206 and 208, respectively. The other EPMs 302B-E may have similar components and structure as the EPM 302A.

The EPMs 302A-E are disposed such that when any two consecutive EPMs, such as EPM 302A and 302B, are switched to the activated or "ON" state, both EPMs exhibit an external polarized magnetic field such that like poles of the EPMs face each other or are adjacent to each other, and the EPMs are repelled away from each other. In an example, the EPMs 302A-E may be disposed such that the EPMs contact each other. However, in other examples, the EPMs could be disposed such that gaps separate them. In another example, the gaps could include compliant material disposed between the EPMs.

The actuator 300 may include a stop element 312 at one end of the series of EPMs 302A-E configured to precluded the EPM 302A from repelling beyond a particular location of the stop element 312. Further, the EPM 302E disposed at the other end of the series of EPMs 302A-E may be coupled to a piston 314. In an example, the EPM 302E may be integrated into the piston 314. In this configuration, the series of EPMs are disposed between the piston 314 and the stop element 312.

In an example, the stop element 312 could be a hard-stop. In another example, a compliant material 315 (e.g., a spring, rubber, or elastic material that can absorb kinetic energy of the EPM 302A) could be disposed between the stop element 312 and the EPM 302A.

Switching two or more of the EPMs 302A-E to the activated or "ON" state may cause a cascading motion of the EPMs 302A-E, thus causing the piston 314 to move. As an example, if the EPMs 302A and 302B are both switched to the "ON" state by sending an electric pulse to their coils, the south pole (S) of the EPM 302A faces the south pole (S) of the EPM 302B. Consequently, a repulsive force is generated between the EPMs 302A and 302B, and they may be repelled away from each other. The EPM 302A might not translate beyond the stop element 312 or the complaint material 315, and therefore the EPM 302B may be repelled in a direction of arrow 316 (rightward in FIG. 3). Particularly, the EPM 302B moves toward the EPM 302C. If the EPM 302C is in the passive or "OFF" state, then the EPM 302B may push the EPM 302C toward the EPM 302D. The EPM 302C may then push the EPM 302D toward the EPM 302E. The EPM 302D may then push the EPM 302E and cause it to move along with the piston 314 coupled thereto in the direction of the arrow 316A (rightward in FIG. 3). In this manner, the repulsive force between the EPMs 302A and 302B generated a motive force that pushes the piston 314 away from the stop element 312.

Thus, switching the EPMs 302A-B to the "ON" state caused a cascading motion of the EPMs 302A-E, thus applying a force to the piston 314 and causing it to move. A magnitude of the force applied to the EPM 302E and the piston 314, and thus the force that could be applied by the piston 314 on another object, may be dependent on how many of the EPMs 302A-E are switched to the "ON" state. If one or more EPMs are switched to the "ON" state in addition to the EPMs 302A and 302B, the repulsive forces generated and thus the motive force on the piston 314 may increase. For example, if the EPM 302C is switched to the "ON" state such that its north pole (N) faces or is adjacent to the north pole (N) of the EPM 302B, then the EPM 302C may be repelled away from the EPM 302B, which is repelling away from the EPM 302A. As such, the force applied to the EPM 302C causing it to move in the direction of the arrow 316 may be larger. For instance, the force applied to the EPM 302C may be an aggregation of the force with which the EPM 302B is repelled from the EPM 302A and the force with which the EPM 302C is repelled from the EPM 302B. As a result, the force that is applied to the piston 314 may increase compared to if the EPM 302C is not switched to the "ON" state.

Similarly, if the EPM 302D is switched to the "ON" state such that its south pole (S) faces or is adjacent to the south pole (S) of the EPM 302C, then the EPM 302D may be repelled away from the EPM 302C. At the same time, the EPM 302C is repelling away from the EPM 302B, which is repelling away from the EPM 302A. As such, the force applied to the EPM 302D causing it to move in the direction of the arrow 316 may be larger. As a result, the force that is applied to the piston 314 may increase.

Further, if the EPM 302E is switched to the "ON" state such that its north pole (N) faces or is adjacent to the north pole (N) of the EPM 302D, then the EPM 302E may be repelled away from the EPM 302D. At the same time, the EPM 302D is repelling away from the EPM 302C, which is repelling away from the EPM 302B, which in turn is repelling away from the EPM 302A. As such, the force applied to the EPM 302E causing it to move in the direction of the arrow 316 may be larger. As a result, the force that is applied to the piston 314 may increase.

In this manner, the force applied to the piston 314 causing it to move in the direction of the arrow 316 may be progressively increased by progressively switching more EPMs to the "ON" state. The larger the number of EPMs in the "ON" state, the larger the magnitude of the force applied to the piston 314, thus also the larger the force that the piston 314 applies to other objects.

When the EPMs are switched back to the passive state of "OFF" state, they do not exhibit a repulsive force between them and do not cause a motive force on the piston 314 away from the stop element 312.

In some example implementations, a subset of the EPMs 302A-E could be replaced with permanent magnets. In these implementations, a permanent magnet that is replacing a particular EPM may have the particular polarity of the EPM shown in FIG. 3 when the EPM is switched to the "ON" state. For instance, a permanent magnet may be disposed between two EPMs. As a specific example, the EPMs 302B and 302D could be replaced with permanent magnets.

In the example where gaps separate the EPMs 302A-E from each other, the EPMs that are in the "ON" state may operate as if there is a spring that couples them to each other. However, the spring in this case is a magnetic spring that has an effective spring rate, which may depend on the number of EPMs in the "ON" state, dipole moment, and the gaps between the respective EPMs. In this case, the force that one EPM applies to a neighboring EPM while both of which are in the "ON" state may increase as the gap therebetween decreases.

The actuator 300 may include a spring 318 that couples the piston 314 to a fixed structure or element 320. In this configuration, the spring rate of the spring 318 is such that the force resulting from one or more of the EPMs 302A-E being switched to the "ON" state could overcome the force of the spring 318 to move the piston 314. When the EPMs that are in the "ON" state are switched back to the "OFF" state, the spring 318 retracts the piston 314 in a direction opposite to the direction of the arrow 316 (leftward in FIG. 3). To preclude oscillations that could be caused by the spring 318, the actuator 300 may include stop elements 322A and 322B that prevents the piston 314 from moving leftward beyond the location of the stop elements 322A and 322B. In another example, a damping device may be coupled to the spring 318 so as to mitigate or prevent oscillations of the piston 314.

In an example, the actuator 300 may operate as a brake actuator. In this example, a braking pad 324 may be coupled to the piston 314. As the piston 314 moves, the braking pad 324 may come in contact with a moving object 326. The moving object 326 could be moving linearly (e.g., up and down) or may be a rotary object. When the braking pad 324 contacts the moving object 326, the resulting friction therebetween dissipates the kinetic energy of the moving object 326 and slows it down. The magnitude of the braking force may be based on the number of the EPMs 302A-E that are switched to the "ON" state.

Different configurations could be used in the actuator 300. For example, as mentioned above, a subset of the EPMs 302A-E could be replaced by permanent magnets. In an example, the EPM 302E or the piston 314 may be a permanent magnet. In an example implementation, one EPM and a one permanent magnet could be used. Either the EPM or the permanent magnet could be coupled to the piston 314. Switching the EPM to the "ON" state may repel the EPM away from the permanent magnet thus causing motion of the piston 314. Other example implementations are possible.

FIG. 4 illustrates an actuator 400 with EPMs 402A-E having a different orientation compared to the EPMs 302A-E, in accordance with an example implementation. Particularly, the EPMs 402A-E are disposed such that when any two consecutive EPMs, such as EPMs 402A and 402B, are switched to the "ON", both poles of each EPM face or are adjacent to like poles of the neighboring EPM such that the EPMs are repelled away from each other. For instance, as shown in FIG. 4, if the EPMs 402A and 402B are switched to the "ON" state, the north pole (N) of the EPM 402A faces or is adjacent to the north pole (N) of the EPM 402B. Similarly, the south pole (S) of the EPM 402A faces or is adjacent to the south pole (S) of the EPM 402B. In this configuration, the repulsive force between two consecutive EPMs in the "ON" state may be higher than the respective repulsive force that results in the configuration of FIG. 3. The higher force results because the two poles are repelling the EPMs from each other compared to one pole in the configuration of FIG. 3.

In examples, the EPMs 402A-E could be contacting each other as shown in FIG. 4 or could have compliant material disposed therebetween. However, in other examples, the EPMs 402A-E may be disposed such that respective gaps separate the EPMs 402A-E. The actuator 400 may include the stop element 312 disposed at one end of the series of EPMs 402A-E and configured to preclude the EPM 402A from repelling beyond a particular location of the stop element 312. The EPM 402E disposed at the other end of the series of EPMs 402A-E may be coupled to the piston 314. In an example, the EPM 402E may be integrated into the piston 314

Similar to the configuration of FIG. 3, switching two or more of the EPMs 402A-E may cause a cascading motion of the EPMs 402A-E, thus causing the piston 314 to move. For example, if the EPMs 402A and 402B are both switched to the "ON" state by sending an electric pulse to their coils, the south pole (S) of the EPM 402A faces the south pole (S) of the EPM 402B, and the north pole (N) of the EPM 402A faces the north pole (N) of the EPM 402B. Consequently, the EPMs 402A and 402B exhibit a repulsive force therebetween that pushes them away from each other. The EPM 402A might not translate beyond the stop element 312 or the complaint material 315, and therefore the EPM 402B may be repelled in the direction of the arrow 316 (rightward in FIG. 4). Particularly, the EPM 402B moves toward the EPM 402C. If the EPM 402C is in the "OFF" state, then the EPM 402B may push the EPM 402C toward the EPM 402D. The EPM 402C may then push the EPM 402D toward the EPM 402E. The EPM 402D may then push the EPM 402E along with the piston 314 coupled thereto in the direction of the arrow 316 (rightward in FIG. 4).

Thus, switching the EPMs 402A-B to the "ON" state caused a cascading motion of the EPMs 402A-E, thus applying a motive force to the piston 314 and causing it to move. A magnitude of the force applied to the EPM 402E and the piston 314, and thus the force that could be applied by the piston 314 on another object may be dependent on how many of the EPMs 402A-E are switched to the "ON" state. If one or more EPMs are switched to the "ON" state in addition to the EPMs 402A and 402B, the actuation force applied to the piston 314 may increase. For example, if the EPM 402C is switched to the "ON" state such that its north pole (N) and south pole (S) face or are adjacent to the corresponding north pole (N) and south pole (S) of the EPM 402B, then the EPM 402C may be repelled away from the EPM 402B, which is repelling away from the EPM 402A. For instance, the force applied to the EPM 402C may be an aggregation of the force with which the EPM 402B is repelled from the EPM 402A and the force with which the EPM 402C is repelled from the EPM 402B. As such, the force applied to the EPM 402C causing it to move in the direction of the arrow 316 may be larger. As a result, the motive force that is applied to the piston 314 may increase.

Similarly, if the EPM 402D is switched to the "ON" state such that its north pole (N) and south pole (S) face or are adjacent to the corresponding north pole (N) and south pole (S) of the EPM 402C, then the EPM 402D may be repelled away from the EPM 402C. At the same time, the EPM 402C is repelling away from the EPM 402B, which is repelling away from the EPM 402A. As such, the force applied to the EPM 402D causing it to move in the direction of the arrow 316 may be larger. As a result, the force that is applied to the piston 314 may increase.

Further, if the EPM 402E is switched to the "ON" state such that its north pole (N) and south pole (S) face or are adjacent to the corresponding north pole (N) and south pole (S) of the EPM 402D, then the EPM 402E may be repelled away from the EPM 402D. At the same time, the EPM 402D is repelling away from the EPM 402C, which is repelling away from the EPM 402B, which in turn is repelling away from the EPM 402A. As such, the force applied to the EPM 402E causing it to move in the direction of the arrow 316 may be larger. As a result, the force that is applied to the piston 314 may increase.

In this manner, the force applied to the piston 314 causing it to move in the direction of the arrow 316 may be progressively increased by progressively switching more EPMs to the "ON" state. The larger the number of EPMs in the "ON" state, the larger the magnitude of the force applied to the piston 314, and thus the larger the force that the piston 314 applies to other objects.

When the EPMs are switched back to the passive state, they do not exhibit a repulsive force between them and do not cause a motive force on the piston 314 away from the stop element 312.

In some example implementations, a subset of the EPMs 402A-E could be replaced with permanent magnets. In these implementations, a permanent magnet that is replacing a particular EPM may have the particular polarity of the EPM shown in FIG. 4 when the EPM is switched to the "ON" state. For instance, a permanent magnet may be disposed between two EPMs. As a specific example, the EPMs 402B and 402D could be replaced with permanent magnets.

Further, similar to the actuator 300, the actuator 400 may include the spring 318 that couples the piston 314 to the fixed element 320. In this configuration, the spring rate of the spring 318 is such that the force resulting from one or more of the EPMs 402A-E being switched to the "ON" state could overcome the force of the spring 318 to move the piston 314. When the EPMs that are in the "ON" state are switched back to the "OFF" state, the spring 318 retracts the piston 314 in a direction opposite to the direction of the arrow 316 (leftward in FIG. 4). To preclude oscillations that could be caused by the spring 318 or an effective magnetic spring between the EPMs 402A-E, the actuator 400 may include the stop elements 322A and 322B that prevents the piston 314 from moving leftward beyond the location of the stop elements 322A and 322B. In another example, a damping device may be coupled to the spring 318 so as to mitigate or prevent oscillations of the piston 314.

In an example, similar to the actuator 300, the actuator 400 may operate as a brake actuator. The braking pad 324 may be coupled to the piston 314, and as the piston 314 moves, the braking pad 324 may come in contact with the moving object 326, which could be moving linearly (e.g., up and down) or may be a rotary object. When the braking pad 324 contacts the moving object 326, the resulting friction therebetween dissipates the kinetic energy of the moving object 326 and slows it down. The magnitude of the braking force may be based on the number of the EPMs 402A-E that are switched to the "ON" state.

In examples, the actuators 300 and 400 may include other components. For instance, the EPMs 302A-E or 402A-E may be mounted on or within a tube to facilitate linear motion of the EPMs. Other components are possible as well.

FIG. 5 illustrates a side view of a braking system 500, in accordance with an example implementation. The braking system 500 includes a first disk 502 and a second disk 504. The second disk 502 may be coupled to an input shaft 505 and is thus rotatable therewith.

The first disk 502 may have one or more EPMs 506 disposed on at least one side face (e.g., front or back side face) or surface of the first disk 502. The EPMs 506 may be similar to the EPMs 200, 302A-E, or 402A-E, for example. In an example where the first disk 502 has more than one EPM, the EPMs 506 may form a radial array about the side surface of the first disk 502. In this example, the EPMs 506 may be equi-angularly and equi-radially disposed about the side surface of the first disk 502. In other words, the EPMs 506 may be disposed at equal radial distance from a center of the first disk 502, and angles formed by any two lines connecting two consecutive EPMs 506 with the center of the first disk 502 are equal. This configuration may facilitate having the second disk 504 stop at a particular desired location or set of locations when the EPMs 506 are activated. However, in other examples, the EPMs 506 might not be equi-angularly spaced and might not be disposed at equal distance from the center of the first disk 502.

The second disk 504 has a plurality of ferromagnetic elements 508 (e.g., made of magnet steel, or includes permanent magnets and/or EPMs) that form a radial array about the side surface of the second disk 504 that faces the side surface of the first disk 502 having the EPMs 506. The ferromagnetic elements 508 may be equi-angularly and equi-radially disposed on the side surface of the second disk 504. The radial distance from the center of the first disk 502 to the EPMs 506 and the radial distance from the center of the second disk 504 to the ferromagnetic elements 508 may be equal such that each of the EPMs 506 faces or is adjacent to a corresponding ferromagnetic element 508.

However, in other examples, the ferromagnetic elements 508 might not be equi-angularly and equi-radially disposed about the side surface of the second disk 504. For example, the EPMs 506 may be disposed on the surface of the first disk 502 such that the EPMs 506 form a square shape instead of a radial array. Similarly, the ferromagnetic elements 508 may be disposed on the surface of the second disk 504 such that the ferromagnetic elements 508 form a square shape instead of a radial array. In this example configuration, the attractive forces that may cause a rotational speed of the second disk 504 to change (e.g., slow down) when the EPMs 506 are activated might be highest at the four corners of the square shape.

The first disk 502 and the second disk 504 are juxtaposed on respective axially spaced planes such that an axial gap 510 separates the first disk 502 from the second disk 504 as shown in FIG. 5. If the EPMs 506 are in the "OFF" state, then no external magnetic field is generated therefrom, and no substantial interaction occurs between the EPMs 506 and the ferromagnetic elements 508. Thus, the second disk 504 may rotate freely.

If an electric pulse is provided to the coils of the EPMs 506, then the EPMs 506 switch to the "ON" state and an external magnetic field is generated therefrom. When a particular ferromagnetic element 508 approaches a corresponding EPM 506, a magnetic circuit is closed and the external magnetic field with flux lines 512 attracts the ferromagnetic element 508 to the EPM 506. As a result, the second disk 504 is magnetically coupled to the first disk 502, and because the first disk 502 is stationary, a rotational speed of the second disk 504 may change (e.g., slow down). Thus, providing an electric pulse to the EPM 506 effectively applies a braking force on the rotating second disk 504 to slow it down.

As a particular ferromagnetic element 508 rotates away from a particular EPM 506, the magnetic circuit might be opened; however, a subsequent ferromagnetic element 508 approaches the particular EPM 506 and another magnetic circuit is closed. Therefore, the second disk 504 may remain magnetically coupled to the first disk 502, and the braking force remains applied to the second disk 504.

If more than one EPM 506 is disposed on the side surface of the first disk 502, then providing electric pulses to the EPMs 506 may increase the braking force as each EPM 506 may attract a corresponding ferromagnetic element 508 that is adjacent to the EPM 506. The larger the number of EPMs 506 that are switched to the "ON" state, the larger the braking force. In this manner, the braking force applied to the second disk 504 may be progressively increased by progressively switching more EPMs to the "ON" state.

The ferromagnetic elements 508 could take several forms. For example, the ferromagnetic elements 508 could include magnet steel blocks as shown in FIG. 5. However, the ferromagnetic elements could include permanent magnets, for example.

FIG. 6 illustrates a braking system 600 with ferromagnetic elements configured as permanent magnets 602, in accordance with an example implementation. As shown, the EPM 506 is configured such that, in the "ON" state, its north pole (N) faces or is adjacent to the south pole (S) of the corresponding permanent magnet 602, and the south pole (S) of the EPM 506 faces or is adjacent the north pole (N) of the permanent magnet 602. Therefore, when an electric pulse is sent to the EPM 506, an external magnetic field is generated such that the permanent magnet 602 is attracted to the EPM 506 and a rotational speed of the second disk 504 may change (e.g., slow down).

FIG. 7 illustrates a braking system 700 with ferromagnetic elements configured as EPMs 702, in accordance with an example implementation. As shown, the EPMs 702 are similar to the EPMs 506, but, in the "ON" state, have opposite polarity compared to the EPMs 506. Particularly, when both the EPM 506 and the EPM 702 are in the "ON" state, the north pole (N) of the EPM 702 faces or is adjacent to the south pole (S) of the EPM 506, and the south pole (S) of the EPM 702 faces or is adjacent the north pole (N) of the EPM 506. Therefore, when an electric pulse is sent to both the EPM 702 and the EPM 506, an external magnetic field is generated such that the EPMs 702 and 506 are attracted to each other and a rotational speed of the second disk may change (e.g., slow down).

As shown in FIGS. 5-7, the disks 502 and 504 face each other such that an axis of rotation of the second disk 504 may be coincident with an axis of the first disk 502. However, in another example, the disks 502 and 504 may be offset relative to each other.

Figure 8:
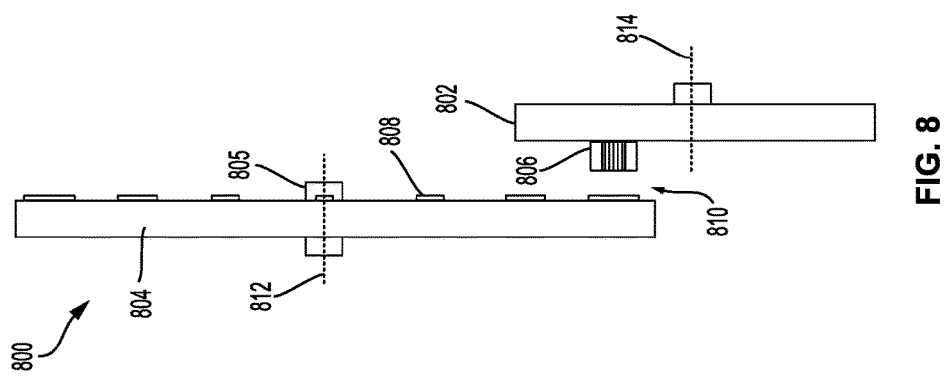
FIG. 8 illustrates a braking system with a first disk being offset relative to a second disk, in accordance with an example implementation.

FIG. 8 illustrates a braking system 800 with a first disk 802 being offset relative to a second disk 804, in accordance with an example implementation. The second disk 804 may be coupled to an input shaft 805 and is thus rotatable therewith.

The first disk 802 is stationary and may have at least one EPM 806 disposed on at least one side face (e.g., front or back side face) or surface of the first disk 802. The EPM 806 may be similar to the EPMs 200, 302A-E, or 402A-E, 506, or 702, for example.

The second disk 804 has a plurality of ferromagnetic elements 808 (e.g., made of magnet steel, or includes permanent magnets and/or EPMs) that form a radial array about the side surface of the second disk 804 that faces the side surface of the first disk 802 having the EPM 806. In examples, the ferromagnetic elements 808 may be equi-angularly and equi-radially disposed on the side surface of the second disk 804. However, in other examples, they might not be equi-angularly and equi-radially disposed about the side surface of the second disk 804.

The first disk 802 and the second disk 804 are juxtaposed on respective axially spaced planes such that an axial gap 810 separates the first disk 802 from the second disk 804. Axis of rotation 812 of the second disk 804 is offset from an axis 814 of the first disk 802.

If the EPM 806 is in the "OFF" state, then no external magnetic field is generated therefrom, and no substantial interaction occurs between the EPM 806 and the ferromagnetic elements 808. Thus, the second disk 804 may rotate freely.

If an electric pulse is provided to the coil of the EPM 806, then the EPM 806 switches to the "ON" state and an external magnetic field is generated therefrom. When a particular ferromagnetic element 808 approaches the EPM 806, a magnetic circuit is closed and the external magnetic field attracts the ferromagnetic element 808 to the EPM 806. As a result, the second disk 804 is magnetically coupled to the first disk 802. Because the first disk 802 is stationary, the attraction between the EPM 806 and the ferromagnetic element 808 may effectively apply a braking force on the second disk 804 and may slow it down.

As the particular ferromagnetic element 806 rotates away from the EPM 806, the magnetic circuit might be opened; however, a subsequent ferromagnetic element 806 approaches the EPM 806 and another magnetic circuit is closed. Therefore, the braking force on the second disk 804 may remain applied thereto.

The ferromagnetic elements 808 could take any of the forms discussed above with respect to FIGS. 5-7. For example, the ferromagnetic elements 808 could include magnet steel blocks (see, e.g., FIG. 5), permanent magnets (see, e.g., FIG. 6), and/or EPMs (see, e.g., FIG. 7).

In FIGS. 5-8, the disks are juxtaposed on respective axially spaced planes such that an axial gap separates the disks from each other. In other examples, the disks may be radially disposed relative to each other.

Figure 9:
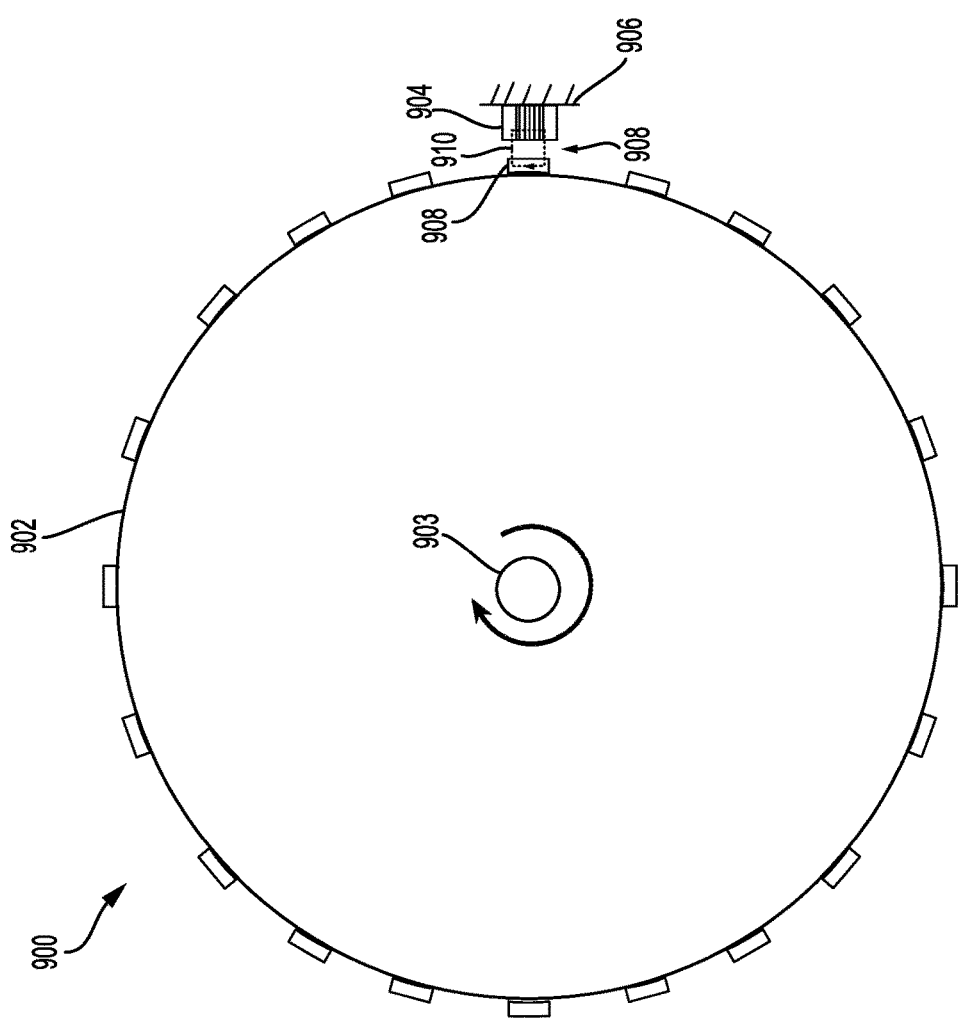
FIG. 9 illustrates a braking system 900, in accordance with an example implementation.

FIG. 9 illustrates a braking system 900, in accordance with an example implementation. The braking system 900 includes a disk 902 may be coupled to an input shaft 903 and is thus rotatable therewith. The braking system 900 further includes at least one EPM 904 mounted to a surface 906. The EPM 904 may, for example, be similar to any of the EPMs 200, 302A-E, 402A-E, 506, 702, or 806. The surface 906 could be a peripheral surface of another disk that is stationary.

The disk 902 has a plurality of ferromagnetic elements 908 (e.g., made of magnet steel, or includes permanent magnets and/or EPMs) circumferentially spaced apart about a periphery or a peripheral surface of the disk 902. In an example, the ferromagnetic elements 908 may be equi-angularly spaced about the periphery of the disk 902; however, in other examples, they might not be equi-angularly spaced about the periphery of the disk 902.

In the example implementation, the disk 902 and the surface 906 are disposed in a radially spaced juxtaposed relation to one another such that a radial gap 908 separates the disk 902 from the surface 906.

If the EPM 904 is in the "OFF" state, then no external magnetic field is generated therefrom, and no substantial interaction occurs between the EPM 904 and the ferromagnetic elements 908. Thus, the disk 902 may rotate freely.

If an electric pulse is provided to the coil of the EPM 904, then the EPM 904 switches to the "ON" state and an external magnetic field with flux lines 910 is generated therefrom. When a particular ferromagnetic element 908 approaches the EPM 904, a magnetic circuit is closed and the flux lines 910 pass through the ferromagnetic element 908 and attract it to the EPM 904. As a result, the EPM 904 may effectively apply a braking force on the disk 902 and may slow it down.

A ferromagnetic element 908 is closest to the EPM 904 when the ferromagnetic element 908 is at the 9 o'clock position from a perspective of a viewer of the disk 902 in FIG. 9. Therefore, the magnetic circuit may be closed when the ferromagnetic element 908 reaches the 9 o'clock position or slightly before the 9 o'clock position.

As the ferromagnetic element 908 rotates away from the EPM 904 during rotation of the disk 902, the magnetic circuit might be opened; however, a subsequent ferromagnetic element 908 approaches the EPM 904 and another magnetic circuit is closed. Therefore, the braking force may remain applied to the disk 902.

FIG. 10 illustrates a braking system 1000 with an axis 1001 of a first disk 1002 being perpendicular to an axis of rotation 1003 of a second disk 1004, in accordance with an example implementation. As shown in FIG. 10, the first disk 1002 is disposed in a plane that is perpendicular to a respective plane of the second disk 1004.

The first disk 1002 has at least one EPM 1006 disposed about a periphery thereof. The EPM 1006 could be, for example, similar to any of the EPMs 200, 302A-E, 402A-E, 506, 702, 806, or 904. The second disk 1004 has a plurality of ferromagnetic elements 1008 that could include magnet steel, permanent magnets, and/or EPMs.

The second disk 1004 is configured to rotate with an input shaft 1010. If the EPM 1006 is energized, then it interacts with the ferromagnetic elements 1008 as described above with respect to FIGS. 5-9. As a result, a rotational speed of the second disk 1004 may change (e.g., slow down).

In any of the braking systems and apparatuses described above, the braking force could be alleviated by providing a negative electric pulse to the EPMs to switch them to the "OFF" state.

The actuators, apparatuses and systems described above allow for high switching speeds as switching occurs by providing an electric pulse. The electric pulse has a finite duration (e.g., 200 milliseconds) and could be provided in a response time of 100 milliseconds making switching brakes on or off quick. Also, the actuators, apparatuses, and systems described above may have low power consumption because EPMs consume power when switching, as opposed to continuous consumption of power.

The actuators, apparatuses, and systems described above involve a reduced number of moving parts compared to traditional actuators and braking systems and may eliminate friction between moving parts, thus increasing efficiency and reliability.

IV. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An actuator comprising:
    a piston;
    a stop element; and
    a series of electro-permanent magnets (EPMs) comprising at least a first EPM and a second EPM, wherein the series of EPMs is constrained between the piston and the stop element, wherein each EPM may be switched between (i) an activated state in which the EPM exhibits an external polarized magnetic field and (ii) a passive state in which the EPM does not exhibit an external polarized magnetic field, wherein the first EPM and second EPM are arranged such that when both the first EPM and the second EPM are in the activated state, a magnetic pole of the first EPM is adjacent to the a like magnetic pole of the second EPM, and the first EPM and the second EPM exhibit a repulsive force between them causing a motive force on the piston away from the stop element, and wherein when both the first EPM and the second EPM are in the passive state, they do not exhibit a repulsive force between them and do not cause a motive force on the piston away from the stop element.

2. The actuator of claim 1, wherein the motive force is a first motive force, wherein the series of EPMs further comprises a third EPM, wherein when the first EPM, the second EPM, and the third EPM are in the activated state, the exhibit a respective repulsive causing a second motive force on the piston away from the stop element, and wherein the second motive force is greater than the first motive force.

3. The actuator of claim 1, further comprising:
    a brake pad coupled to the piston.

4. The actuator of claim 1, wherein the stop element is a hard stop.

5. The actuator of claim 1, further comprising:
    a spring mounted between a fixed element and the piston, wherein the spring is configured to retract the piston when the first EPM and the second EPM are in the passive state.

6. The actuator of claim 1, further comprising:
    a compliant element disposed between the stop element and the first EPM.

7. The actuator of claim 1, wherein the first EPM and the second EPM are arranged such that when both the first EPM and the second EPM are in the activated state both magnetic poles of the first EPM are adjacent to like magnetic poles of the second EPM.

\* \* \* \* \*